US008270489B2

(12) United States Patent
Amon (10) Patent No.: US 8,270,489 B2
(45) Date of Patent: Sep. 18, 2012

(54) ADAPTIVE INTERPOLATION IN IMAGE OR VIDEO ENCODING

(75) Inventor: Peter Amon, München (DE)

(73) Assignee: Siemens Aktiengesellschaft, Munich (DE)

( * ) Notice: Subject to any disclaimer, the term of this patent is extended or adjusted under 35 U.S.C. 154(b) by 1327 days.

(21) Appl. No.: 11/918,400

(22) PCT Filed: Mar. 30, 2006

(86) PCT No.: PCT/EP2006/061168
§ 371 (c)(1),
(2), (4) Date: Oct. 12, 2007

(87) PCT Pub. No.: WO2006/108765
PCT Pub. Date: Oct. 19, 2006

(65) Prior Publication Data
US 2009/0232212 A1    Sep. 17, 2009

(51) Int. Cl.
*H04N 7/12* (2006.01)
(52) U.S. Cl. .................................. 375/240.15; 382/300
(58) Field of Classification Search ..... 375/240–240.29; 382/260, 276, 299, 300; 348/538
See application file for complete search history.

(56) References Cited

U.S. PATENT DOCUMENTS

| 5,546,130 A | 8/1996 | Hackett |
| 5,663,764 A | 9/1997 | Kondo et al. |
| 6,420,348 B1 | 7/2002 | Kim et al. |
| 6,591,398 B1 | 7/2003 | Kondo et al. |
| 6,782,143 B1 | 8/2004 | Dube et al. |
| 7,555,043 B2 * | 6/2009 | Sato et al. ................. 375/240.16 |
| 2002/0130969 A1 * | 9/2002 | Han et al. ....................... 348/452 |
| 2002/0154697 A1 | 10/2002 | Jeon |
| 2005/0018916 A1 | 1/2005 | Kondo |
| 2009/0190844 A1 * | 7/2009 | Park et al. ...................... 382/233 |

FOREIGN PATENT DOCUMENTS

| DE | 10 2004 041 664 A1 | 3/2006 |
| JP | 02-011078 | 1/1990 |
| JP | 02-011079 | 1/1990 |
| JP | 4010768 | 1/1992 |
| JP | 07-162812 | 6/1995 |
| JP | 08-088856 | 4/1996 |
| JP | 09-037243 | 2/1997 |
| JP | 2003-169337 | 6/2003 |

OTHER PUBLICATIONS

H. Schwarz, T. Hinz, D. Marpe, T. Wiegand: Further im-provements of the HHI proposal for SVC CE 1, M11398, Palma, Spanien, Oktober 2004, ISO/IEC JTC1/SC29/WG11, MPEG2004/M11398.
Japanese Office Action issued Jul. 20, 2012 in corresponding Japanese Patent Application No. 2008-505859 (2 pages).

* cited by examiner

*Primary Examiner* — Ricky Ngo
*Assistant Examiner* — Kan Yuen
(74) *Attorney, Agent, or Firm* — Staas & Halsey LLP

(57) ABSTRACT

A method processes and transmits of data in which image data of an image in the transmitter are provided at a first resolution level and at a second resolution level, higher than the first resolution level. At least one interpolation parameter is fixed, for the determination of image data of the second resolution level form image data of the first resolution level. At least some of the image data of the first and the second resolution levels are transmitted, whereby the transmission of the image data the second resolution level depends on at least one fixed interpolation parameter. Furthermore, a definition of the at least one fixed interpolation parameter is transmitted.

14 Claims, 3 Drawing Sheets

FIG 3

ADAPTIVE INTERPOLATION IN IMAGE OR VIDEO ENCODING

CROSS REFERENCE TO RELATED APPLICATIONS

This application is based on and hereby claims priority to International Application No. PCT/EP2006/061168 filed on Mar. 30, 2006 and German Application No. 10 2005 016 827.2 filed on Apr. 12, 2005, the contents of which are hereby incorporated by reference.

BACKGROUND

The invention relates to a method for processing and transmitting, as well as for receiving and processing data. The invention also relates to a transmitter and receiver for implementing the method.

In communication systems, messages are transmitted between the transmitter and receiver. A special example of communication systems are radio communication systems. Messages, for instance containing speech information, image information, video information, SMS (Short Message Service), MMS (Multimedia Messaging Service) or other data, are transmitted here between the transmitter and receiver via a radio interface with the aid of electromagnetic waves. Radio stations can in this case be different types of subscriber-side radio stations, repeaters or network-side radio facilities such as base stations or radio access points, depending on the concrete configuration of the radio communication system. In a mobile radio communication system, at least one part of the subscriber-side radio stations are mobile radio stations. The electromagnetic waves are emitted at carrier frequencies which lie in the frequency band provided for the respective system.

Mobile radio communication systems are often designed as cellular systems, e.g. according to the GSM standard, (Global System for Mobile Communication) or UMTS (Universal Mobile Telecommunications System) with a network infrastructure including base stations, facilities for monitoring and controlling the base stations and further network-side facilities for instance. Aside from these wide-spread organized (supralocal) cellular, hierarchical radio networks, wireless local networks (WLANs, Wireless Local Area Networks) with a generally spatially significantly more limited radio coverage area also exist.

Examples of information which is transmitted in communication systems are images or videos, with the latter being a sequence of images. By virtue of the high data rates required for the transmission of image or video data, suitable encoding methods are used particularly in radio communication systems for image or video data. The use of scalable information is particularly suited to this, with the basic information being transmitted during the transmission of scalable information and additionally the information supplementing the basic information. Scalable data thus has the characteristic of being able to be present at the receiver with a reduced quality, by the receiver only decoding the basic information or the basic information and a part of the supplementary information and not the basic information and all supplementary information. The scalability of the image or video data can relate to a plurality of scaling dimensions, thus to the local resolution of individual images for instance.

SUMMARY

One possible object is to identify efficient methods for processing and transmitting or receiving data. Suitable apparatuses for implementing the method should also be presented.

The inventor proposes a method for processing and transmitting data, in which image data of an image at a first resolution level and at a second resolution level which is higher by comparison with the first resolution level is present on the transmitter side. At least one interpolation parameter is fixed in order to determine image data of the second resolution level from image data of the first resolution level by interpolation. At least some of the image data of the first and second resolution level is transmitted, with the transmission of the image data of the second resolution level depending on the at least one fixed interpolation parameter. Furthermore a definition of the at least one fixed interpolation parameter is transmitted.

The processed data is preferably video data, i.e. a sequence of images. An image can be displayed by a plurality of image data, in this case this can be in particular the numerical values, with which the individual pixels of the image are occupied. Image data in at least two resolution levels is available to the transmitter, preferably a video or image encoder. The resolution level designates the number of pixels of the image, a higher resolution level is characterized by more pixels than a lower resolution level.

At least one interpolation parameter is fixed on the transmitter side. Using the at least one interpolation parameter allows image data of the second resolution level to be determined from image data of the first resolution level by interpolation. The at least one interpolation parameter specifies an instruction or a concrete configuration of an instruction, by which the determination of image data of the second resolution level from image data of the first resolution level can be carried out. This enables further variables to have some influence on the determination of the image data of the second resolution level, aside from the at least one interpolation parameter and the image data of the first resolution level, i.e. the image data of the second resolution level determined by interpolation must not be exclusively determined from image data of the first resolution level. The at least one interpolation parameter can relate to the overall image of the second resolution level; however, it is also possible for the at least one interpolation parameter to only be used to determine image data of a region of the image of the second resolution level. The image data of the other regions can be determined for instance by other interpolation parameters or transmitted without using interpolation parameters.

At least one part of the image data of the second resolution level is transmitted after determining the at least one interpolation parameter. The transmitter herewith accounts for the at least one fixed interpolation parameter, preferably by image data, which can be determined by interpolation using the at least one fixed interpolation parameter, not being transmitted. The scope and formation of the image data of the second resolution level, which is transmitted, thus depend on the at least one fixed interpolation parameter.

The image data and the definition of the at least one fixed interpolation parameter is preferably transmitted by radio waves, other transmission techniques can however also be used. It is advantageous if the image data and the definition of the at least one fixed interpolation parameter are transmitted in a common message; alternatively the use of separate messages for the image data on the one hand and the definition of the at least one fixed interpolation parameter on the other hand is possible.

The inventor also proposes fixing the at least one interpolation parameter and selecting from a plurality of interpolation parameters, with a quality of image data of the second resolution level determined using the at least one interpolation parameter being accounted for during the selection. The at least one interpolation parameter can be selected according to an algorithm, thus for instance according to a rate distortion optimization.

With the first method for receiving and processing data, received image data of an image at a first resolution level is present on the receiver side. At least one interpolation parameter is fixed in order to determine image data of the image at a second resolution level which is higher by comparison with the first resolution level from image data of the first resolution level by interpolation. The at least one interpolation parameter is fixed by evaluating a received definition of the at least one interpolation parameter. The at least one interpolation parameter is used to determine image data of the second resolution level from image data of the first resolution level.

Afore-described general embodiments relating to the first method for processing and transmitting data can be transferred to the first method for receiving and processing data.

In one configuration, the definition of the at least one interpolation parameter includes information which relates exclusively to the at least one interpolation parameter.

According to a second method for processing and transmitting data proposed by the inventor, image data of an image at a first resolution level and at a second resolution level which is higher by comparison with the first resolution level is present on the transmitter side. At least one interpolation parameter is fixed in order to determine image data of a first region of the image at a second resolution level from image data of the first resolution level by interpolation. The at least one interpolation parameter is fixed, by evaluating information relating to at least one second region of the image of the second resolution level, which differs from the first region, and/or relating to at least one region of the image of the first resolution level. At least some of the image data of the first and second resolution level is transmitted, with the transmission of image data of the second resolution level depending on the at least one fixed interpolation parameter.

Afore-described general embodiments relating to the first method for processing and transmitting data can be transferred to the second method for processing and transmitting data.

In order to fix the at least one interpolation parameter, information is evaluated according to the second method for processing and transmitting data, said information not relating to the observed first region of the image of the second resolution level for which the at least one interpolation parameter is fixed. This information can relate to one or a plurality of other regions of the image of the second resolution level. In addition or alternatively, the information can relate to one or a plurality of regions of the image of the first resolution level, i.e. to the first region of the first resolution level and/or to one or a plurality of other regions of the first resolution level.

According to the second method for receiving and processing data, received image data of an image at a first resolution level is present on the receiver side. At least one interpolation parameter is fixed in order to determine image data of a first region of the image at a second resolution level from image data of the first resolution level by interpolation. The at least one interpolation parameter is fixed, by evaluating information relating to at least one second region of the image of the second resolution level, which differs from the first region, and/or relating to at least one region of the image of the first resolution level. The at least one interpolation parameter is used to determine image data of the first region of the second resolution level from image data of the first resolution level.

Afore-described general embodiments relating to the second method for processing and transmitting data can be transferred to the second method for receiving and processing data.

The information preferably includes, pertaining to the at least one second region of the image of the second resolution level and/or pertaining to the at least one region of the image of the first resolution level:

Interpolation parameters for the at least one second region of the image of the second resolution level and/or for the at least one region of the image of the first resolution level, and/or Information for encoding and/or decoding the first region of the second resolution level as a function of a decoding result of the at least one second region of the second resolution level, such as the intra-encoding mode for instance and/or A block size for the at least one second region of the second resolution level and/or for the at least one region of the first resolution level, such as for instance a block size for the movement estimation and/or movement compensation or a block size for a transformation of image data in the frequency range, and/or Information relating to the encoding and/or decoding of the at least one second region of the second resolution level and/or the at least one region of the first resolution level, such as a block mode for instance.

In one embodiment, the image is an integral part of video data and in order to fix the at least one interpolation parameter, information relating to a temporal correlation between the image and at least one other image is also used in addition to information relating to at least one second region of the image of the second resolution level and/or relating to at least one region of the image of the first resolution level.

The methods also include at least the one interpolation parameter comprising a rule for interpolation at an image region border. One rule for interpolation at an image region border advantageously specifies how the image data is to be sustained for the purpose of interpolation at an image region border.

In particular, the at least one interpolation parameter can comprise filter methods, characterized for instance by filter lengths and filter weights, and/or an image region size.

It is advantageous if the first method for processing and transmitting data is used temporarily and the second method for processing and transmitting data is used temporarily, or in respect of one or a plurality of interpolation parameters the first method for processing and transmitting a data is used and in respect of one or a plurality of other interpolation parameters the second method for processing and transmitting data is used. The same also applies to the method for receiving and processing data.

The transmitter and receiver are particularly suited to implementing the method, with it also being possible to apply this to the embodiments and developments. The transmitter and receiver can be realized by several facilities which are connected to one another.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
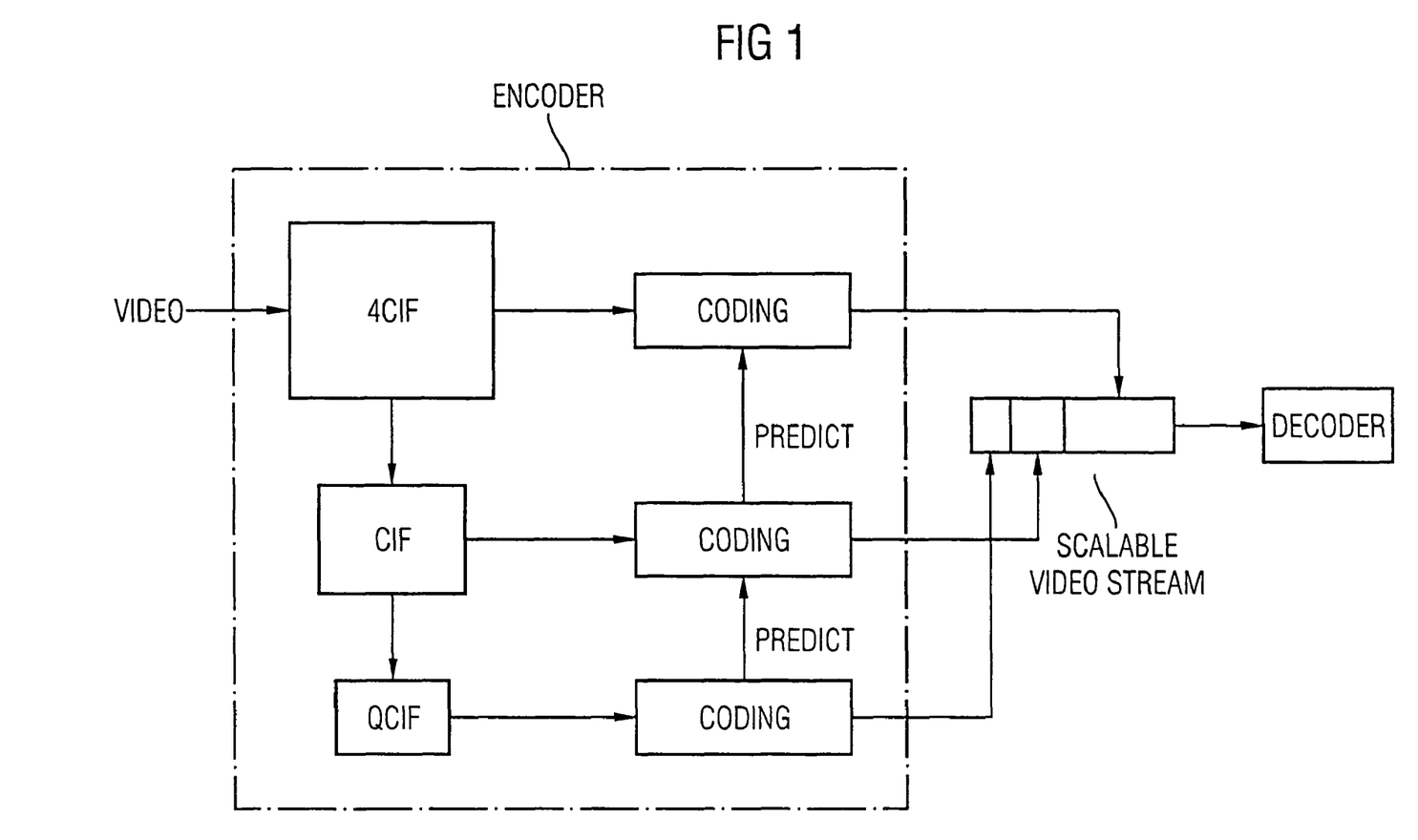
FIG. 1: shows a cutout from a radio communication system.

FIG. 1 shows a cutout from a radio communication system which includes an encoder ENCODER and a decoder DECODER. The encoder ENCODER encodes video data VIDEO, in order then to transmit this to the decoder DECODER as scalable video data SCALABLE VIDEO STREAM by radio waves. While the assumption is made below that the transmission between the ENCODER and DECODER is carried out by radio waves, the proposed method can also be applied to other transmission techniques. With the scalable encoding of the video sequence VIDEO, the steps described below are carried out in order to simultaneously transmit a plurality of spatial resolution levels of the images of the video data VIDEO by the scalable video data SCALABLE VIDEO STREAM, without repeatedly transmitting information at different resolution levels.

The original images of the video sequence VIDEO, in FIG. 1 for instance in the size 4CIF (4 times Common Intermediate Format, this corresponds to an image size with 704×576 pixels), are firstly subscanned and/or low pass filtered in order to generate images of lower resolution levels/image sizes, in FIG. 1 CIF (Common Intermediate Format, this corresponds to an image size with 352×288 pixels) and QCIF (Quarter Common Intermediate Format, this corresponds to an image size with 176×144 pixels).

The 4CIF, CIF and QCIF video sequences are encoded separately from one another in the CODING step. To avoid transmitting the same or similar information a plurality of times and thus increasing the encoding efficiency, encoded elements, e.g. movement vectors, pixel values, mode information such as block modes for instance, of a resolution level are predicted by the next lowest resolution level. In other words, encoded elements of the resolution level CIF are calculated from encoded elements of the resolution level QCIF and encoded elements of the resolution level 4CIF are calculated from encoded elements of the resolution level CIF. An interpolation is used during the prediction of the pixel values of an image, with which interpolation the pixel values of the next higher resolution level are determined from the pixel values of the same images of the lower resolution level.

The predicted values are used here to determine on the transmitter side which data has to be transmitted to the decoder DECODER. I.e. the scalable video data SCALABLE VIDEO STREAM does not contain the overall 4CIF and CIF video sequences generated on the basis of the encoding CODING, but instead a smaller range of encoded 4CIF and CIF data, since the decoder DECODER can determine non-transmitted data by prediction. The encoder ENCODER thus determines an interpolation method per image and per resolution level and selects the data to be sent to the decoder DECODER relating to this image and this resolution level as a function of the interpolation method used. Depending on the receiver-side quality requirements and capabilities of the terminal, the decoder DECODER can extract resolution levels of the scalable video data SCALABLE VIDEO STREAM and can if necessary omit and/or not decode information of higher resolution levels which is not needed.

Figure 2:
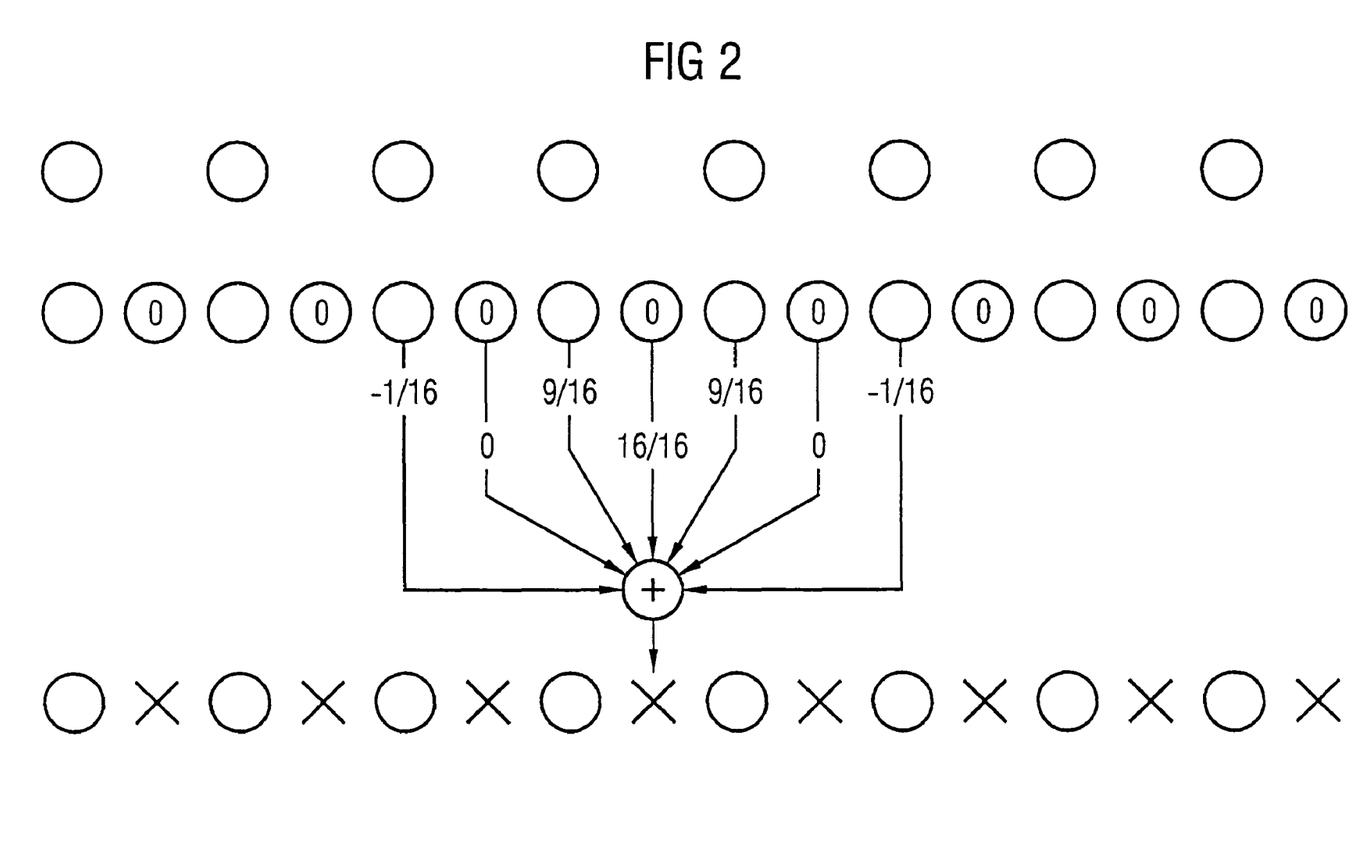
FIG. 2: shows a schematic representation of an interpolation method.

With the interpolation, new pixel values, i.e. the pixel values of the image of the higher resolution level, must be determined from the available pixel values, i.e. from the pixel values of the same image of the lower resolution level. This generally occurs by filtering, with the two-dimensional filtering of an image advantageously being separated into two one-dimensional filterings, i.e. into a horizontal and a vertical filtering, in order to reduce the computing outlay. These two filterings can be calculated one after the other. A one-dimensional filtering is illustrated in FIG. 2, with the size of the image being doubled in this example. The circles of the upper line in FIG. 2 correspond to the pixels of the image of the lower resolution level. The pixel positions of the lower resolution level are firstly extended by intermediate pixel positions with the value 0, symbolized in the middle line by zeros in the circles. With filtering, the pixel values are multiplied and added with filter weights, in FIG. 2 with $-1/16$, 0, $9/16$, $16/16$, $9/16$, 0 und $-1/16$. Adding the weighted pixel values of the image of the lower resolution level results in a pixel value of the image of the higher resolution level in each instance, symbolized in the lower line of FIG. 2 by crosses. This procedure is repeated for each pixel of the higher resolution level, by displacing the filter weights by one position in each instance. In the example of the pixel weights according to FIG. 2, the pixel values of the lower resolution level are adopted in the image of the higher resolution level for the pixels on the positions of the image of the lower resolution level.

FIG. 2 shows a 4-tab filtering. The number 4 refers here to the number of filter weights, which are used, in the concrete example the numbers $-1/16$, $9/16$, $9/16$ and $-1/16$. Further examples of filters are a 2-tab filter, with the filter weights $1/2$ and $1/2$ for instance and a 6 tab filter, with the filter weights $1/32$, $-5/32$, $20/32$, $20/32$, $-5/32$ and $1/32$ for instance.

Figure 3:
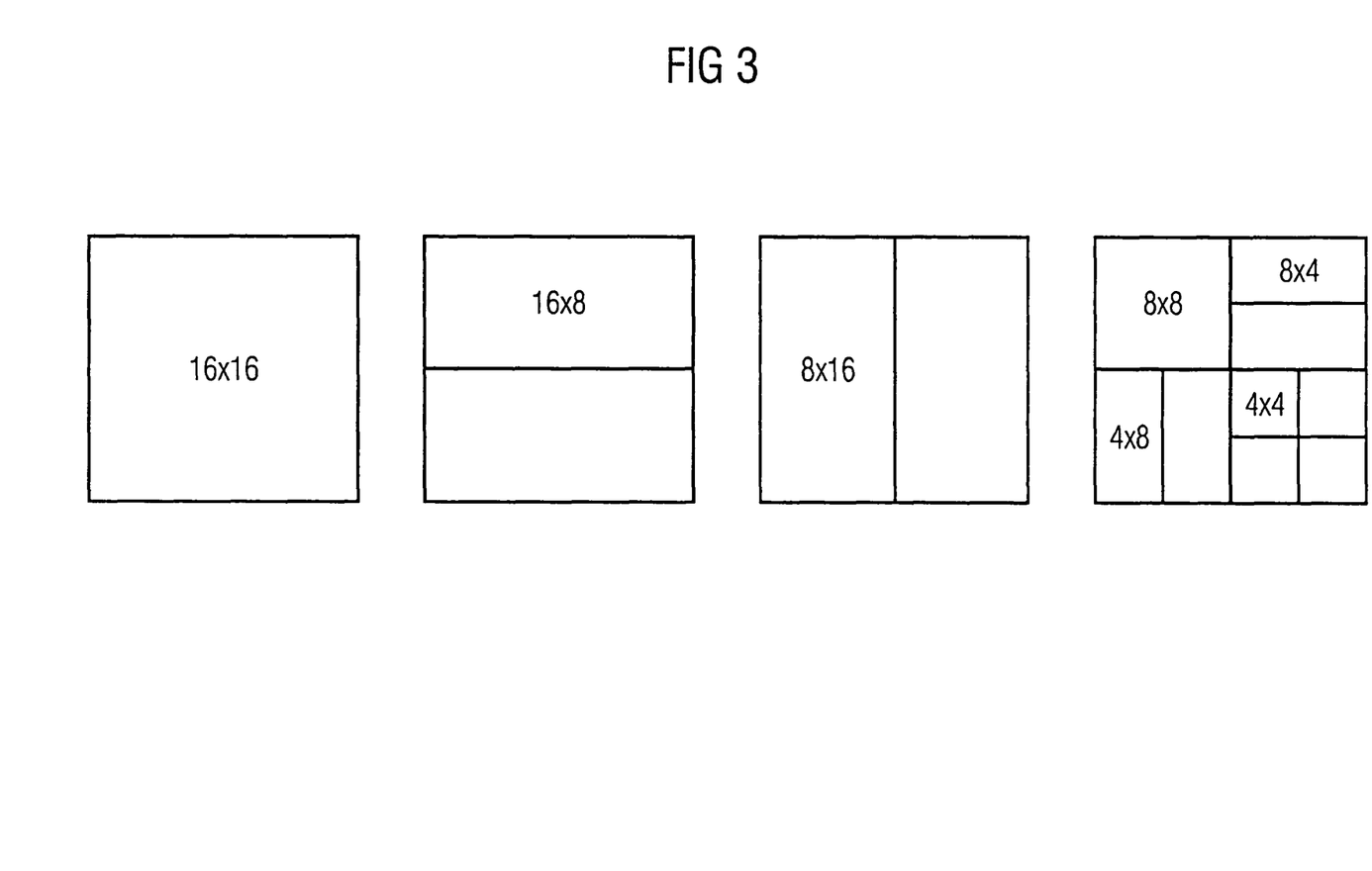
FIG. 3: shows a division of an image into blocks.

The described interpolation can occur across the whole image region. It is however also possible to divide an image into a plurality of regions and to calculate the filtering for each region. By way of example, FIG. 3 shows such a division of a 16×16 region of an image: in accordance with the second illustration this can be divided from the left into two equally sized 16×8 blocks, in accordance with the third illustration, from the left into two equally sized 8×16 blocks and in accordance with the right illustration into an 8×8 block, two 8×4 blocks, two 4×8 blocks und four 4×4 blocks.

Pixels required to calculate the filtering can lie outside the image and/or block at the edges of an image or block. One possibility, known as constant border extension, of eliminating this problem relates to using the value of the pixel on the image border for the pixel lying outside the observed region. With another possibility known as mirroring, the pixel values are reflected onto the image or block border and these pixels generated by the mirroring are used to calculate the filtering.

According to the related art, described in H. Schwarz, T. Hinz, D. Marpe, T. Wiegand: "Further improvements of the HHI proposal for SVC CE 1", M11398, Palma, Spain, October 2004 for instance, the encoder uses a fixed determined interpolation method which is known to the receiver as a function of the image type, which is established by the temporal correlation of different images.

The encoder ENCODER selects suitable interpolation parameters for each image and for each resolution level of the image. These interpolation parameters are the filter, the block size and the rules for the generation of pixel values on the image and/or block borders. Examples of concrete configurations of these parameters are detailed above, other configurations can however also be used. It is possible for the encoder ENCODER to select additional variables which can be used with interpolation, aside from said interpolation parameters.

The interpolation parameters are selected adaptively, i.e. the interpolation parameters are dependent on the image and/or image region to be processed in each instance. The same interpolation parameters are not essentially used for specific image types. In fact, the interpolation parameters used vary in a flexible manner with the same image type with the concrete image to be transmitted.

In order to select suitable interpolation parameters, a rate distortion optimization is preferably carried out, i.e. the encoder ENCODER compares the quality of images, which are generated by the use of different interpolation parameters and sets these in respect of data rates required for the radio transmission of images using these interpolation parameters. Those interpolation parameters are used, which produce the best image with a given data rate and/or which require the lowest data rate with the given image quality. By comparison with the related art, in which the interpolation parameters are fixed, a higher quality with the same or lower data rate of the radio transmission and/or a disproportionately increased quality with increased data rates is herewith achieved.

The interpolation parameters used by the encoder ENCODER must be known to the decoder DECODER, in order to be able to determine image data of the next higher resolution level from the received image data of a resolution level by interpolation. To this end, the encoder ENCODER is able to explicitly signal to the decoder DECODER the interpolation parameters it uses. With the explicit signaling, the interpolation parameters are transmitted to the decoder DECODER as page data. This can occur independently of syntax elements used according to the related art. It is however advantageous to extend syntax elements used according to the related art, thus by the introduction of new block modes for instance. With the explicit signaling, information elements are thus sent by the encoder ENCODER, said information elements exclusively being used to determine the interpolation parameters to be used. The decoder DECODER is able to explicitly infer these information elements and to directly infer the interpolation parameters to be used.

Alternatively or in addition to the explicit signaling, the decoder DECODER can determine the interpolation parameters to be used from other information:

Other image regions can be used in order to determine the interpolation parameters for a fixed image region:

Use of the interpolation parameters of other blocks: The interpolation parameters for a block of an image can be calculated from interpolation parameters from one or a plurality of other blocks of the same image. This enables, e.g. the encoder ENCODER to explicitly inform the decoder DECODER about the interpolation parameters of at least one block of an image, and the decoder DECODER then uses these interpolation parameters to calculate interpolation parameters of other blocks of the same image.

Use of the Intra-Encoding Mode:

With the intra-encoding mode, the encoder ENCODER informs the decoder DECODER that decoding results of one or a plurality of blocks of an image are to be used to decode another block of the same image. This can be transmitted to the interpolation parameters of the different blocks, so that if the intra-encoding mode indicates to the decoder DECODER for instance that the decoder result of a first block of an image is to be used to calculate the decoder result of a second block of the same image, the decoder DECODER uses the interpolation parameters of the first block as the interpolation parameters of the second block.

In addition to the above-mentioned variables, information relating to the temporal correlation of different images can be used to determine the interpolation parameters:

The block size for the movement estimation and compensation of the region to be encoded, The block size for the movement estimation and compensation of an adjacent already encoded region or another already encoded region of the same image, The block variable of the transformation, i.e. for the transfer of pixels in the frequency range, to lower resolution levels of the region to be encoded or other regions of the same image, Block modes to lower resolution levels of the adjacent region and region to be encoded, Prediction mode.

Combinations of the above-detailed variables can be used to determine the interpolation parameters. With the signaling implicitly described in the last paragraph, the decoder DECODER thus receives information which does not relate to the interpolation parameters of the currently observed image region. The decoder DECODER uses this information to determine the interpolation parameters. If the interpolation parameters are not explicitly signaled to the decoder DECODER, the encoder ENCODER and the decoder DECODER must use the same determination instruction to determine the interpolation parameters from the information used herefor. If the intra-encoding mode is used to implicitly signal the interpolation parameters for instance, the encoder ENCODER determines the interpolation parameters from the intra-encoding mode transmitted to the decoder DECODER and uses these interpolation parameters with the selection of the image data to be transmitted to the decoder DECODER. The determination instruction of the interpolation parameters from the intra-encoding mode is known to the decoder DECODER, so that it uses the same interpolation parameters as the encoder ENCODER.

It is possible for the interpolation parameters to depend on one another. It is advantageous for instance to use short filters in the case of small regions/block sizes. If a dependency exists between different interpolation parameters, not all interpolation parameters have to be notified during the explicit signaling. It is also possible to keep one or a plurality of parameters fixed, so that only the configuration of the other interpolation parameters needs to be signaled to the decoder DECODER or determined by the decoder DECODER.

A combination of the two methods presented is advantageous, i.e. the explicit signaling of the interpolation parameters and the implicit signaling, i.e. the determination of the interpolation parameters by the decoder DECODER from other information. The determination of the interpolation parameters by the decoder DECODER reduces the quantity of page data required so that more radio resources are available to transmit useful information. In the case of quality losses resulting from deficient interpolation parameters based on the determination instruction of the interpolation parameters from the other information with the implicit signaling, the interpolation parameters can be explicitly signaled in order to increase the quality in terms of rate distortion optimization.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for processing image data of an image, with which first image data of the image at a first resolution level and second image data of the image at a second resolution level which is higher than the first resolution level is present, comprising:
    identifying at least one fixed interpolation parameter from a plurality of potential interpolation parameters such that the second image data of the second resolution level is generatable from the first image data of the first resolution level by interpolation based upon the fixed interpolation parameter; and
    generating the second image data of the second resolution level by interpolation of the first image data of the first resolution level based on the fixed interpolation parameter,
    wherein the fixed interpolation parameter is a combination of potential interpolation parameters of one or more selected different resolution filters for executing the interpolation, information relating to a temporal correlation between the image and another image, and a rule for interpolation of a border region of the image where other image data associated with a region outside the image border region would be required,
    wherein the image is an integral part of video data.

2. The method according to claim 1, wherein a potential interpolation parameter further includes a selected size of an image region to which the interpolation by the one or more selected different resolution filters is applied.

3. The method claim 1, wherein the interpolation parameter is identified according an explicit selection signal and/or a determination.

4. The method according to claim 1, wherein the fixed interpolation parameter is identified according to a rate distortion optimization based upon use of different potential interpolation parameters.

5. A method for receiving and processing data, comprising:
    receiving a definition and first image data of an image at a first resolution level; and
    setting a interpolation parameter by evaluating the definition with which second image data at a second resolution level which is higher than the first resolution level, is obtainable from the first image data at the first resolution level using interpolation according to the interpolation parameter to be set by evaluating the definition,
    wherein the interpolation parameter is a combination of: one or more selected different resolution filters for executing the interpolation, information relating to a temporal correlation between the image and another image, and a rule for interpolation of a border region of the image where other image data associated with a region outside the image border region would be required,
    wherein the image is an integral part of video data.

6. A method for processing and transmitting image data of an image, with which first image data of the image at a first resolution level and second image data of the image at a second resolution level which is higher than the first resolution level is present for transmission, comprising:
    setting at least one fixed interpolation parameter, which can be used within a first region of the image to determine second image data at the second resolution level from the first image data at the first resolution level using interpolation, the fixed interpolation parameter being set by evaluating the first image data at the first resolution level and/or evaluating the second image data at the second resolution level relating to a second region of the image, said second region differing from the first region; and
    transmitting the first image data of the first resolution level,
    wherein the fixed interpolation parameter is a combination of: one or more selected different resolution filters for executing the interpolation, information relating to a temporal correlation between the image and another image and a rule for interpolation of a border region of the image where other image data associated with a region outside the image border region would be required,
    wherein the image is an integral part of video data.

7. The method according to claim 6, wherein the fixed interpolation parameter further includes a selected size of an image region to which the interpolation by the one or more selected different resolution filters is applied.

8. The method as claimed in claim 6, wherein the first and second image data evaluated to set the fixed interpolation parameter includes:
    interpolation parameters for the first or second region of the image,
    information for encoding and/or decoding the second image data at the second resolution level within the first region of the image as a function of a decoder result of the second image data at the second resolution level within a second region of the image,
    a block size for the first or second regions of the image, and/or
    information relating to the encoding and/or decoding of the first or second regions of the image.

9. The method as claimed in claim 8, wherein the block size for the first or second region of the image relates to:
    a block size for movement estimation and/or movement compensation and/or a block size for a transformation of the image in a frequency range.

10. A method for receiving and processing data, comprising: receiving first image data of an image at a first resolution level;
    setting a fixed interpolation parameter with which second image data at a second resolution level which is higher than the first resolution level, is determinable within a first region of the image from the first image data of the first resolution level using interpolation, the fixed interpolation parameter being set by evaluating the first image data at the first level and/or by evaluating the second image data at the second resolution level relating to a second region of the image different from the first region of the image; and
    using the fixed interpolation parameter within the first region to determine the second image data of the second resolution level from the first image data of the first resolution level,
    wherein the fixed interpolation parameter is a combination of: one or more selected different resolution filters for executing the interpolation, information relating to a temporal correlation between the image and another image, and a rule for interpolation of a border region of the image where other image data associated with a region outside the image border region would be required,
    wherein the image is an integral part of video data.

11. The method according to claim 10, wherein the fixed interpolation parameter further includes a selected size of an image region to which the interpolation by the one or more selected different resolution filters is applied.

12. The method as claimed in claim 10 wherein the first and second image data evaluated to set the fixed interpolation parameter includes:
- interpolation parameters for the first or second region of the image,
- information for encoding and/or decoding the second image data at the second resolution level within the first region of the image as a function of a decoder result of the second image data at the second resolution level within the second region of the image,
- a block size for the first or second region of the image, and/or
- information relating to the encoding and/or decoding of the first or second regions of the image.

13. The method as claimed in claim 12 wherein the block size for the first or second region of the image relates to:
- a block size for movement estimation and/or movement compensation and/or
- a block size for a transformation of the image in a frequency range.

14. A transmitter to process and transmit image data, comprising:
- a setting unit to set a interpolation parameter usable within a first region to determine second image data of the image at a second resolution level which is higher than a first resolution level from the first image data at a first resolution level using interpolation, the interpolation parameter being set by evaluating the second image data at the second resolution level relating to a second region of the image, which differs from the first region, and/or the interpolation parameter being set by evaluating the first image data at the first resolution level relating to the first region of the image;
- a selector to select the second image data at the second resolution level to be transmitted as a function of the interpolation parameter; and
- a transmitter to transmit the first image data at the first resolution level and the selected second image data at the second resolution level such that the second image data at the second resolution that is determinable by interpolation using the interpolation parameter, is not transmitted, wherein the interpolation parameter is a combination of one or more selected different resolution filters for executing the interpolation, information relating to a temporal correlation between the image and another image, and a rule for interpolation of a border region of the image when other image data associated with a region outside the image border region would be required, wherein the image is an integral part of video data.

* * * * *

UNITED STATES PATENT AND TRADEMARK OFFICE
CERTIFICATE OF CORRECTION

PATENT NO.        : 8,270,489 B2
APPLICATION NO.   : 11/918400
DATED             : September 18, 2012
INVENTOR(S)       : Peter Amon Page 1 of 1

It is certified that error appears in the above-identified patent and that said Letters Patent is hereby corrected as shown below:

On the Title Page
Title Page Under Item (30) Foreign Application Priority Data, please add DE 10 2005 016 827.2 4/12/2005.
Title Page Col. 2 Item (56) (Other Publications), Line 3, Delete "Oktober" and insert -- October --, therefor.

In the Claims
Column 9, Line 31, In Claim 3, Delete "method claim" and insert -- method according to claim --, therefor.
Column 9, Line 32, In Claim 3, Delete "and/for" and insert -- and/or --, therefor.
Column 10, Line 9, In Claim 6, Delete "image and a" and insert -- image, and a --, therefor.
Column 12, Line 17, In Claim 14, Delete "of" and insert -- of: --, therefor.
Column 12, Line 22, In Claim 14, Delete "when" and insert -- where --, therefor.

Signed and Sealed this
Sixteenth Day of April, 2013

Teresa Stanek Rea
*Acting Director of the United States Patent and Trademark Office*